United States Patent Office 3,563,906
Patented Feb. 16, 1971

3,563,906
POLYAMINE CURING AGENTS FOR USE IN PREPARING POLYURETHANE ELASTOMERS AND FOAMS
Guenther Kurt Hoeschele, Wilmington, Del., assignor to E. I. du Pont de Nemours and Company, Wilmington, Del., a corporation of Delaware
No Drawing. Continuation-in-part of application Ser. No. 668,961, Sept. 19, 1967, which is a continuation-in-part of application Ser. No. 631,868, Apr. 19, 1967, which in turn is a continuation-in-part of application Ser. No. 552,704, May 25, 1966, which are all now abandoned. This application Dec. 4, 1968, Ser. No. 781,276
Int. Cl. C09k 3/00; C08g 22/00, 22/44
U.S. Cl. 252—182                            10 Claims

ABSTRACT OF THE DISCLOSURE

Amine curing agents for liquid isocyanato-terminated polyurethanes obtained by condensing a monoamine composition with formaldehyde in the presence of a mineral acid. The monoamine can be 2-chloroaniline or mixtures of 2-chloroaniline with aniline and/or o-toluidine. The proportions of reactants are selected to produce curing agents which have moderate reactivities and exhibit a limited tendency to crystallized under normal operation conditions. The amine compositions are particularly useful as curing agents in the preparation of polyurethane foams. The new compounds, 3-chloro-4,4'-diaminodiphenylmethane and 3-chloro-3'-methyl-4,4'-diaminodiphenylmethane can be obtained from appropriate reaction products.

RELATED APPLICATIONS

This application is a continuation-in-part of co-pending application Ser. No. 668,961 now abandoned which is a continuation-in-part of application Ser. No. 631,868 now abandoned which is a continuation-in-part of application Ser. No. 552,704 now abandoned.

BACKGROUND OF THE INVENTION

This invention relates to new curing agents for isocyanato-terminated prepolymers. More particularly it relates to new mixtures of di- and polyamines having reactivities and melting properties making them particularly useful for curing liquid isocyanato-terminated prepolymers.

Polyurethane compositions obtained by curing liquid isocyanato-terminated prepolymers with diamines are finding increased use in diverse applications requiring castable elastomers. Because of their abrasion resistance, they are frequently used as coatings on surfaces subject to mechanical wear. Spray application of an undiluted mixture of prepolymer and amine curing agent is a particularly convenient means of preparing such coatings. However, the use of these polyurethanes in spraying as well as other applications has been somewhat restricted due to difficulties encountered in the curing processes with the diamine curing agents currently available. The main difficulty resulting from the use of these and other diamines with the prepolymers currently available is that solvents are usually required. Solvents are undesirable for reasons such as toxicity, flammability and cost. In addition, in spraying applications, the thin films obtained from a single coat of diluted material are seldom adequate for protecting against wear.

The most commonly used amine curing agents are hindered or negatively substituted aromatic diamines of which 3,3'-dichlorobenzidine and 4,4'-methylenebis(2-chloroaniline) ("MOCA") are representative. To a lesser extent unhindered aromatic diamines such as 4,4'-methylenedianiline (MDA) and the phenylenediamines are used. The main advantage of the hindered diamine curing agents is their long pot life which in some cases facilitates molding operations. In spray applications, long pot life is undesirable because the freshly mixed and sprayed material often sags or drips before setting up. On the other hand, the unhindered aromatic diamines are so reactive that molding of polyurethanes prepared with their use, whether foamed or otherwise, is almost impossible and in spraying applications, gelling of the polyurethane occurs before the sprayed material has a chance to form an even coating. Furthermore, the highly reactive unhindered amines cause frequent plugging of spray equipment employing internal mixing. Generally, the relatively high melting points and rapid rates of crystallization of both hindered and unhindered diamines make them difficult to mix with the liquid isocyanato-terminated prepolymers and awkward to handle in the absence of a solvent. This is particularly true when the curing agents are used in the field. There has been a need in the art, therefore, for amine curing agents having moderate reactivities and exhibiting a limited tendency to crystallize under normal operating conditions.

The prior art polyamine curing agents have also been deficient for use in preparing polyurethane foams by reaction of an isocyanate and polyol (or an isocyanato-terminated prepolymer) with said curing agents in the presence of an expanding agent. Unhindered diamines such as MDA promote such rapid reaction that the foam formulation solidifies before full expansion is achieved. Hindered diamines such as "MOCA" have long pot lives, but once reaction occurs the foam formulation gels so rapidly that only incomplete expansion occurs. Moreover, the properties of foams prepared from prior art curing agents, particularly their compression set, have been disappointing in many cases.

SUMMARY OF THE INVENTION

It has been discovered that mixtures consisting essentially of aromatic di- and polyamines obtained by condensing a monoamine composition with formaldehyde in the presence of a mineral acid are excellent curing agents for liquid isocyanato-terminated polyurethanes. The monoamine used consists essentially of 2-chloroaniline or mixtures of amines containing at least 20 mole percent of 2-chloroaniline, 0-80 mole percent aniline and 0-80 mole percent o-toluidine. The total monoamine to formaldehyde mole ratio employed is 1.3-2.0:1 with the proviso that when about 90-100 mole percent of the amine is 2-chloroaniline, the ratio of total moles of amine to formaldehyde does not exceed 1.8:1. In some instances the unreacted monoamines are removed by distillation of the reaction product as will be discussed hereinafter.

The new compositions of the present invention have reactivities which bridge the gap in reactivities characterizing the amine curing agents currently available. In the case where the monoamine composition consists essentially of 2-chloroaniline, the resulting curing agent has a reactivity similar to "MOCA," Moreover, the new compositions exhibit such a limited tendency to crystallize that they can be normally handled as liquids which greatly facilitates mixing with liquid polyisocyanates. The new agents provide cured products having excellent properties, comparable to those obtained by curing with prior art agents. Because of these characteristics, castable polyurethanes employing the new curing agents can be readily applied in undiluted form by spraying. It should be noted, however, that the new compositions can often be used to advantage in forming castable polyurethanes by other procedures. The curing agents of this invention are also useful for preparing microcellular and foamed polyurethane elastomers which result when a suitable amine curing agent and an isocyanato-terminated prepolymer or polyisocyanate and polyol in the case of "one-shot" systems are mixed in the presence of an expanding agent such as methylene chloride or trichlorofluoromethane.

DETAILED DESCRIPTION

The compositions of the present invention are obtained by condensing formaldehyde with a monoamine composition hereinafter described in detail. By employing certain proportions of the amine compositions and formaldehyde, condensation products are obtained which exhibit little tendency to crystallize and have suitable viscosities and reactivities for use as curing agents for urethane prepolymers. The compositions of the present invention are believed to be mixtures containing one or more diamines, related triamines and higher polyamines in varying proportions. The diamines which can be present are 4,4' - methylenedianiline, 4,4' - methylenebis(2-chloroaniline), 3-chloro - 4,4' - diaminodiphenylmethane, 4,4' - methylenebis(2 - methylaniline), 3 - chloro - 3'-methyl - 4,4' - diaminodiphenylmethane and 3-methyl-4, 4'-diaminodiphenylmethane. The triamines which can be present are believed to have the following structure in which R, R' and R" can each independently be hydrogen, chlorine or methyl:

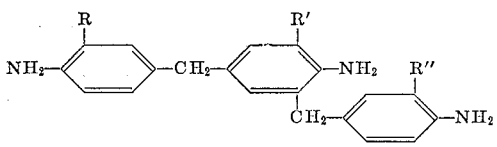

The higher polyamines are believed to have structures similar to that proposed for the triamines.

Preparation of the mixtures of this invention can be accomplished by any of tne following procedures. In the preferred procedures, aqueous formaldehyde is added to the monoamine composition used in the presence of a mineral acid such as hydrochloric or sulfuric acid. The formaldehyde addition generally is performed at temperatures below about 50° C., but can be run at temperatures approaching 100° C. Following the formaldehyde addition, the reaction mass is heated for about 1 hour to several hours at temperatures from about 60° C. to 100° C. The acidic reaction mass is neutralized and the organic material is separated. At this point, any unreacted monoamines can be removed by steam or vacuum distillation; however, as will be pointed out hereinafter, removal of unreacted monoamines is not required for certain preferred mixtures included by the present invention. After drying, and filtering if any solids are present, the resulting mixture of di- and polyamines is the desired product. Alternatively, formaldehyde can be added to one of the monoamines or to a portion of 2-chloroaniline (if it is the only monoamine used) in the presence of mineral acid at temperatures below about 50° C., with the other monoamines (or remaining portion of 2-chloroaniline) being added after formaldehyde addition. In this stepwise procedure, heating at 60° C. to 100° C. as before is required after all of the monoamine has been added. Isolation of the product is accomplished as described for the mixed condensation. Detailed procedures for performing the mixed and step-wise condensation are provided by the examples.

Regardless of the procedure used the quantity of acid required is not critical and can be routinely determined by one skilled in the art. A generally practical amount is from about 0.5 to 2.0 moles of acid per mole of amine. Particularly good reaction rates and high conversions of monoamines are obtained when 0.9 to 1.2 moles of acid are employed per mole of amine. Representative mineral acids which can be used are hydrochloric acid, sulfuric acid and phosphoric acid. The strong mineral acids such as hydrochloric acid and sulfuric acid are preferred.

In carrying out the present invention it is important to control the mole ratio of each of the mono-amines, aniline, 2-chloroaniline and o-toluidine, which can be present in the amine composition used. To obtain curing agents having the advantages described herein the monoamine compositions used are those containing about 20–100 mole percent 2-chloroaniline, 0–80 mole percent aniline and 0–80 mole percent o-toluidine, or stated another way, for each mole of 2-chloroaniline present the monoamine compositions contain from about 0.0–4.0 moles of aniline and/or o-toluidine. As the amount of 2-chloroaniline used in the amine composition increases, the product becomes higher melting and crystallizes more rapidly. When a lesser amount of aniline and/or o-toluidine than 10 mole percent is used and the ratio of total moles of monoamine to formaldehyde is in the range of about 1.8 to 2.0, the product contains large amounts of 4,4'-methylenebis(2-chloroaniline) with the result that it is higher melting, crystallizes more rapidly an differs only slightly in reactivity from pure 4,4'-methylenebis(2-chloroaniline). To compensate for this effect, the ratio of total moles of amine to formaldehyde is adjusted downward to not exceed about 1.8 when less than 10 mole percent of the amine composition is aniline and/or o-toluidine. As the mole ratio of aniline and/or o-toluidine to 2-chloroaniline is increased within the limits specified, the reactivity of the mixtures of amine curing agents produced increases. At the same time, the concentration of tri- and polyamines is increased. This results in an increase in viscosity of the condensation products. Condensation products made with increasing ratios of aniline and/or o-toluidine to 2-chloroaniline have less tendency to crystallize and exhibit a lower rate of crystallization, these tendencies becoming more pronounced as the proportion of aniline increases. If less than 20 mole percent 2-chloroaniline is used in the amine composition, products differing only slightly in reactivity from pure 4,4' - methylenedianiline, 3-methyl-4,4'-diaminodiphenylmethane or 4,4'-methylenebis(2-methylaniline) are obtained, depending on the relative proportions of aniline and o-toluidine present.

It is frequently of commercial advantage in those embodiments of the invention in which aniline is employed as a reactant to use crude 2-chloroaniline which is the product obtained directly by the standard iron or hydrogen reduction of 2-chloronitrobenzene without fractional distillation of the product. A representative process of this type is given in U.S. Patent 3,073,865 to Spiegler. The crude 2-chloroanilines of this type can contain as much as 15% or more aniline and about 2% or less of non-volatile tarry materials which are formed during the reduction process. The amount of aniline in the crude 2-chloroaniline is taken into account in proportionally reducing the quantity of aniline (if any) to be added from another source.

Condensation products prepared from about equimolar mixtures of aniline and 2-chloroaniline at mole ratios of total monoamine to formaldehyde approaching 2:1 contain significant quantities of 3-chloro-4,4' - diaminodiphenylmethane. Those prepared from about equimolar mixtures of 2-chloroaniline and o-toluidine at mole ratios of total amine to formaldehyde approaching 2:1 contain significant quantities of 3-chloro-3'-methyl-4,4'-diaminodiphenylmethane. A diamine fraction enriched in 3-chloro-4,4'-diaminodiphenylmethane is readily obtained as a crystalline material having a melting point of 77–79° C. by vacuum distillation of the proper condensation product. Substantially pure 3-chloro-4,4' - diaminodiphenylmethane can be obtained from this enriched fraction by routine fractional extractions with a weak acid such as dilute aqueous acetic acid. The melting point can be raised to 82–83° C. by recrystallization. A diamine fraction enriched in 2-chloro-3'-methyl-4,4'-diaminodiphenylmethane having a melting range of about 84–100° C. can be obtained by vacuum distillation. Both compounds are useful curing agents for urethane prepolymers but suffer from the usual disadvantage of conventional diamine curing agents in that crystallize rapidly in contrast to the other curing agents of this invention.

The raio of the total moles of monoamine to the moles of formaldehyde is maintained within the limits of 1.3 to 2.0 to obtain mixtures which provide the advantages offered by the present invention, with the proviso that when the monoamine composition contains less than 10 mole percent of aniline and/or o-toluidine the total amine to formaldehyde ratio does not exceed 1.8. If the ratio falls below about 1.3 the condensation products contain very high concentrations of polyamines and are too viscous to be manufactured conveniently or for practical use. In fact for some applications such as in the preparation of castable polyurethanes, the ratio should be greater than 1.6. If the ratio is above 2.0, diamines predominate in the condensation product and there are not sufficient tri- and polyamines present to prevent rapid crystallization.

Of the compositions included by the present invention, those prepared from the mole ratios of aniline and/or o-toluidine to 2-chloroaniline of 0.1 to 1.0 and ratios of total moles of monoamine to the moles of formaldehyde of 1.65 to 1.9 are preferred. Those in which the monoamine composition is a mixture of aniline and 2-chloroaniline in a mole ratio of 0.1–1.0 mole of aniline per mole of 2-chloroaniline are particularly preferred. The composition of the reaction mixtures using the preferred ranges of reactants, after completion of the condensation and rearrangement, consists essentially of the desired di- and polyamine mixtures of this invention. These mixtures contain such small amounts of unreacted monoamines that steam or vacuum distillation is not usually required to produce useful products. The amounts of unreacted monoamines tolerable can routinely be determined by one skilled in the art by determining their effect on the physical properties of vulcanizates cured with the composition in question. Inasmuch as the removal of monoamines is complicated by the presence of large amounts of high boiling di-, tri- and polyamines, eliminating this step effects substantial savings in manufacture. When the total moles of monoamine to formaldehyde ratio is in excess of 1.65, it is sometimes desirable to use all three of the monoamines since the resulting products usually have a lower melting point than if only two or one of the monoamines is used The amine compositions in which the mole ratios are within the preferred range are generally more resistant to crystallization than are compositions prepared using ratios of total moles of monoamines to moles of formaldehyde approaching 2.0. The viscosities of the preferred compositions are higher than those of preparations using a mole ratio of monoamines to formaldehyde of about 2.0 This is also an advantage because the viscosities of the preferred compositions match or approach the viscosities of many prepolymers with the result that mixing of curing agent and prepolymer is facilitated.

The curing agents of this invention are employed in substantially the same manner as are conventional diamine curing agents. They are particularly useful for curing isocyanato-terminated prepolymers based on either polyether or polyester glycols. For spray applications, prepolymers based on polyethers are generally preferred because of their low viscosity. The subject curing agents can also be used in preparing elastomers by "one-shot" procedures. It is emphasized that the present mixtures can be used at lower temperatures than conventional diamines because they are obtained as liquids which, if they crystallize, do so very slowly and if crystallization occurs, they can be remelted and again held as liquids for long periods of time; e.g., several days to several months.

Generally useful vulcanizates can be obtained by employing the mixtures of amines of this invention in amounts such that there are about 0.8 to 1.2 equivalents of amino groups per equivalent of isocyanato groups, however, the preferred ratio is about .90 to 1.1 equivalents of amino groups per equivalent of isocyanato groups. It has been found that for a given curative level, vulcanizates prepared with the curing agents of this invention are softer than those prepared with conventional diamines. Further, when the properties of vulcanizates prepared with the present curing agents are compared with the properties of diamine vulcanizates of about equal hardness, it is generally found that the present agents give vulcanizates having improved abrasion resistance and lower compression set. The hardness of vulcanizates can be increased readily by raising the free isocyanato group content of the prepolymer being used. It has also been found that when the present curing agents are used, heating is not required to obtain cross-linked vulcanizates. This is particularly advantageous in spray application where high abrasion resistance is often desired and heat curing may be impossible because large surface areas are involved.

The mixtures of amines of this invention are also useful ingredients for the preparation of polyurethane foams. They can be employed in prepolymer, semi-prepolymer and one-shot foam processes in which they replace a portion of the active hydrogen usually supplied by water and/or a polyol. The techniques to be followed for preparation of foams by each of these processes are well known and can routinely be varied by one skilled in the art depending on the type of product desired. Representative foam compositions are those prepared from crude or refined polyisocyanates such as the tolylene diisocyanates, methylenebis(phenylisocyanates) and polyarylene polyisocyanates or mixtures thereof; polyols such as polyalkyleneether polyols and polyester polyols; and an expanding agent such as fluorotrichloromethane and carbon dioxide, the latter being generated upon the addition of water.

The process described in U.S. 2,850,464 illustrates the use of polyamines in general in the preparation of polyurethane foam in water-blown prepolymer systems. In an analogous manner, polyamines can be used in the preparation of foams by semi-prepolymer and one-shot procedures by replacing part of the active hydrogen normally provided by the polyol with a polyamine. While the amine mixtures of this invention can be used to advantage for preparing flexible or rigid foams, they have been found to be particularly useful in the preparation of self-skinned, semi-rigid molded foam articles of moderate and high density. Such articles are useful as exterior and interior automotive trim parts. The overall density of these molded foams can be controlled by adjusting the quantity of expanding agent as is known for conventional polyurethane foams. The skin thickness can be increased by lowering mold temperature and/or increasing the heat capacity and thermal conductivity of the mold. Semi-rigid foam formulations including the amine mixtures of this invention build viscosity and develop gel strength quickly leading to efficient utilization of volatile expanding agents and permitting rapid demolding. However, gelling does not take place prematurely so as to prevent full expansion as is the case with prior art diamines such as 4,4-methylenedianiline and 4,4 - methylenebis(2 - chloroaniline). The self-skinned molded articles prepared using the present amine mixtures accurately reproduce mold surfaces. The skin portions of such molded articles do not evidence any tendency to separate from the lower density interior portions. As previously noted, the compression set of foams cured with the amine mixtures of this invention is lower than that of foams cured with prior art diamines.

In foam applications, amine curing agents prepared from molar ratios of total amine to formaldehyde from about 1.3 up to and including 2.0 can be used. When 2-chloroaniline is the only monoamine used, the ratio should not exceed 1.8. The preferred range for all monoamine compositions except those which consist essentially of 2-chloroamine is about 1.65 to 1.9. The monoamine compositions mentioned above which are employed in preparing the generally preferred curing agents are also used in preparing the preferred foam curing agents. The quantity of amine mixture used relative to the usual foam ingredients can be varied widely. In prepolymer processes when all of the polyol has been reacted with diisocyanate or polyisocyanate prior to foam formation, the amine mixture can even be used as the sole reactant with the prepolymer during the foaming step if a volatile liquid is provided as the expanding agent. However, it is usually preferred to use a mixture of amine and polyol with about 15–85% of the total active hydrogen in the system being provided by the amine mixture. This is true for either semi-prepolymer or one-shot systems. A particularly convenient procedure to follow when the semi-prepolymer or one-shot processes are used is to dissolve the amine curing agent in the polyol component of the formulation prior to mixing with the polyisocyanate. This procedure is especially convenient when the more viscous amine curing agents are used. In some instances, particularly when the amine curing agent is very viscous, it may be advantageous to add the polyol to the curing agent reaction mixture subsequent to neutralization of the acid. This procedure frequently facilitates separation of the viscous amine curing agents from the neutralized reaction mass. The use of the mixtures of amines of this invention in foam preparation is illustrated hereinafter by examples utilizing semi-prepolymer and one-shot techniques.

The invention will now be described with reference to the following examples of specific embodiments thereof wherein parts and percentages are by weight unless otherwise specified.

The following isocyanato-terminated prepolymers are used in the examples for evaluation of the curing agents of this invention.

Prepolymer A is made by reacting 1 mole of polytetramethyleneether glycol having a number average molecular weight of about 1000 with 1.6 moles of 2,4-tolylene diisocyanate. It has a free —NCO content of about 4.1% and a Brookfield viscosity of about 6200 cps. at 50° C.

Prepolymer B is made by reacting 1 mole of polytetramethyleneether glycol having a number average molecular weight of about 1000 with 2.0 moles of 2,4-tolylene diisocyanate. It has a free —NCO content of about 6.2% and a Brookfield viscosity of about 2500 cps. at 50° C.

Prepolymer C is made by reacting a mixture of 1 mole of butanediol-1,3 and 1 mole of polytetramethylene ether glycol, molecular weight about 1000, with 4 moles of tolylene diisocyanate which is 80% 2,4-isomer and 20% 2,6-isomer. It has a free —NCO content of about 9.45% and a Brookfield viscosity of about 5000 cps. at 50° C.

The vulcanizates used for evaluating the curing agents prepared in the following examples are obtained by the following procedure. The amine curing agent and prepolymer are weighed prior to mixing and their temperatures are adjusted to the temperatures indicated in the examples. The prepolymer is placed in an agitated vessel and the liquid curing agent is added as rapidly as possible. Agitation is continued until the mix is uniform, at which time the mix is poured into preheated molds designed for forming test specimens. Curing of the cast material is accelerated by heating in an oven when open molds are used or in a press when closed molds are used. Curing times and temperatures are specified in the examples. The pot life which is reported in the examples represents the elapsed time from the start of mixing until the mixture becomes too viscous to be poured into molds.

The properties of the vulcanizates reported in the examples are measured substantially in accordance with the following ASTM procedures:

Tensile strength—D–412
Elongation break—D–412
Set at break—D–412
Modulus—D–412
Tear strength—D–470
Compression set—D–395
Resilience, Yerzley—D–945
Resilience, Bashore—D–1054
Abrasion resistance—D–394 (Method B, NBS)
Hardness—D–676

A cross-head speed of 20 in./min. is used for the stress-strain measurements obtained by ASTM D–412.

EXAMPLE 1

The step-wise condensation procedure for preparing the novel polyamine mixtures is illustrated as follows:

To a mixture consisting of o-chloroaniline (508 pts.) 36.5% hydrochloric acid (400 pts.) and water (1500 pts.), 37% aqueous formaldehyde (324 pts.) is added with agitation at 30–35° C. After stirring for 10 minutes, aniline (372 pts.) and 37% hydrochloric acid (400 pts.) are charged to the reaction mixture at once. These amounts correspond to a mole ratio of aniline to o-chloroaniline of 1/1 and a mole ratio of total amines to formaldehyde of 2/1. The temperature is raised to 85° C. within 30 minutes and maintained at 85–95° C. for 4 hours. Then, 52.6% sodium hydroxide solution (650 pts.) is added slowly to the reaction mixture while maintaining the temperature at 90° C. The organic layer is separated from the aqueous phase and washed with an equal volume of hot water. The organic layer is freed of water and unreacted monoamine by distillation at reduced pressure. The last traces are removed by distilling at 150° C./0.5 mm. Hg. A total of 77 parts of mixed monoamines is recovered. The mixture consists of 92 mole percent aniline and 8 mole percent 2-chloroaniline. The distillation residue is filtered by suction at 100° C. The filtered product, amounting to 773 pts., does not crystallize on standing at room temperature for 3 months. The liquid has the following temperature-viscosity characteristics.

| Temperature, C°: | Brookfield viscosity (cps.) |
|---|---|
| 32 | 10000 |
| 38 | 2370 |
| 43 | 1720 |
| 48 | 775 |
| 55 | 340 |
| 63 | 170 |
| 74 | 105 |
| 82 | 75 |

Compounding data, curing conditions and properties for vulcanizates (Samples 1 and 2) obtained from Prepolymers A and B respectively and the undistilled polyamine product obtained after filtration are shown in the following table.

| | Sample 1 | Sample 2 |
|---|---|---|
| Prepolymer A, parts | 100 | |
| Prepolymer B, parts | | 100 |
| Polyamine, parts | 11.55 | 16.8 |
| Curative level, percent of theory | 98 | 98 |
| Mixing temperature, °C | 60 | 60 |
| Pot life, min | 3–5 | 2–3 |
| Cure time at 100° C., hrs | 2.5 | 1.5 |
| Tensile strength, p.s.i | 4,200 | 6,000 |
| Elongation at break, percent | 440 | 300 |
| Modulus 100%, p.s.i | 300 | 800 |
| Modulus 300%, p.s.i | 730 | 6,000 |
| Permanent set, percent | 0 | 0 |
| Tear strength, D–470, p.l.i | 29 | 53 |
| Compression set B, 70° C./22 hr., percent | 18 | 12 |
| Yerzley resilience, percent | 71.4 | |
| Bashore resilience, percent | | 22 |
| NBS abrasion resistance, percent | | 313 |
| Hardness, durometer A | 69 | 86 |

When a vulcanizate is prepared from Prepolymer A using 4,4'-methylenebis(2-chloroaniline) at a curative level of 95% of theory as curing agent, it has about the same hardness as Sample 2 and manifests inferior compression set and NBS abrasion resistance when tested by the same procedures as indicated above.

EXAMPLE 2

The mixed condensation procedure for preparing the novel polyamine compositions is illustrated as follows:

To a slurry consisting of 2-chloroaniline (254 pts.) aniline (186 pts.), 97% sulfuric acid (445 pts.) and water (650 pts.), 37.2% aqueous formaldehyde solution (162 pts.) is added at once at 35–40° C. with agitation. These amounts correspond to a mole ratio of aniline to 2-chloroaniline of 1/1 and a mole ratio of total amine to formaldehyde of 2/1. The temperature is increased to 45° C. by the heat of reaction and is further increased by external heating to 85° C. within 30 minutes. After heating at 85–90° C. for 2 hours with stirring, the reaction mixture is made alkaline by adding sodium hydroxide in slight excess and worked up as described in Example 1.

30 parts of unreacted monoamines are recovered by vacuum distillation which corresponds to 6.8% of the total amount of 2-chloroaniline and aniline charged. The mixture of monoamines contains 98.5 mole percent aniline. Substantially identical results are obtained when the unreacted monoamines are removed by steam distillation, rather than vacuum distillation, of the reaction mass after neutralization.

The filtered liquid product does not show any sign of crystallization after standing at room temperature for 15 weeks. The product has a Brookfield viscosity of 636 cps. at 50° C. and an average molecular weight of 278 (determined by cryoscopic method in benzene). The assay for nitrogen is 11.6% and the calculated functionality is 2.30. The functionality is calculated by the following equation;

$$\text{functionality} = \frac{(\text{percent } N)(MW)}{1400}$$

Vulcanizate properties obtained with Prepolymers A and B are substantially the same as those obtained with the polyamine product of Example 1.

EXAMPLE 3

The procedure of Example 2 is repeated as described, but the amount of formaldehyde (36.5%) is increased to 172.5 pts. and the heating cycle is lengthened to 4 hrs. at 90° C. The amounts correspond to a mole ratio of aniline to 2-chloroaniline of 1/1 and a mole ratio of total amines to formaldehyde of 1.9/1.0.

Only 2.05% of monoamines are recovered from the condensation product in this example which is a significant reduction with reference to Example 2 which employs a ratio of 2/1 total moles of amine to moles of formaldehyde. The resulting product is a liquid having a Brookfield viscosity of 1036 cps. at 50° C. The average molecular weight is 289 and the assay for nitrogen is 11.8%, which values correspond to a calculated functionality of about 2.43. This material does not show any sign of crystallization after storage at room temperature for 3 months.

EXAMPLE 4

The procedure of Example 3 is repeated, but the amount of formaldehyde (36.6%) is further increased to 186 pts. These amounts correspond to a mole ratio of aniline to 2-chloroaniline of 1/1 and a mole ratio of total amines to formaldehyde of 1.76/1.

The recovery of unreacted monoamines from this condensation is nil. The resulting liquid has a Brookfield viscosity of 1980 cps. at 50° C., an average molecular weight of 296 and nitrogen assay of 11.8%. The calculated functionality is 2.49. This material does not show any sign of crystallization after storage at room temperature for 3 months.

The table below illustrates compounding data, curing conditions and vulcanizate properties for a vulcanizate (Sample 1) prepared from Prepolymer B and the liquid product of this example.

|  | Sample 1 |
|---|---|
| Prepolymer B, pts. | 100 |
| Polyamine, pts. | 18.6 |
| Curative Level, percent | 103 |
| Mixing temperature, ° C. | 60 |
| Pot life, min.[1] | 4 |
| Cure time at 100° C., hrs. | 1.5 |
| Tensile strength, p.s.i. | 6900 |
| Elongation at break, percent | 300 |
| Modulus 100%, p.s.i. | 1100 |
| Tear strength; D–470, p.l.i. | 63 |
| Compression set B, 70° C./22 hr., percent | 12 |
| NBS abrasion resistance, percent | 234 |
| Hardness, durometer A | 88 |

[1] The pot life for Prepolymer B when cured with the unhindered diamine, methylenedianiline, is estimated to be less than 0.1 min. at 85° C. This pot life is too short to permit normal processing. See A Technical Information Sheet, J. G. D. Pinto, E. I. du Pont de Nemours & Co., Aug. 1, 1961.

When a vulcanizate is prepared from Prepolymer A using 4,4'-methylenebis(2-chloroaniline) at a curative level of 95% of theory as curing agent, it has about the same hardness as Sample 1 and manifests inferior compression set and NBS abrasion resistance when tested by the same procedures as indicated above.

EXAMPLE 5

To a slurry of 2-chloroaniline (382.5 pts.), aniline (93 pts.), 97% sulfuric acid (445 pts.) and water (650 pts.), 37% aqueous formaldehyde (162 pts.) is added at once at 50° C. with agitation. These amounts correspond to a mole ratio of aniline to 2-chloroaniline of 1/3. The total amine to formaldehyde ratio is 2/1. Within 30 minutes, the temperature is raised to 85° C. and the reaction mass is held at 85–90° C. for 1 hr. After neutralizing with caustic, the mixture is worked up by the method of Example 1. About 4.5% unreacted monoamines are recovered which consist of a mixture of aniline (83 mole percent) and o-chloroaniline (17 mole percent). The reaction product (455 pts.) remains liquid on standing at room temperature for about 12 hours and has a Brookfield viscosity of 324 cps. at 50° C.

Compounding data, curing conditions and properties for vulcanizates obtained from Prepolymers A, B and C and this polyamine product are shown in the following table:

| | | | |
|---|---|---|---|
| Prepolymer A, parts | 100 | | |
| Prepolymer B, parts | | 100 | |
| Prepolymer C, parts | | | 100 |
| Polyamine, parts | 11.4 | 16.7 | 25.0 |
| Polyamine level, percent of theory | 95 | 95 | 95 |
| Mixing temperature, ° C | 90 | 90 | 50 |
| Pot life, min | 5–7 | 2–3 | 1.5 |
| Cure time at 100° C., hrs | 3 | 3 | 3 |
| Tensile strength, p.s.i | 4,400 | 5,100 | 5,500 |
| Elongation at break, percent | 410 | 340 | 130 |
| Modulus 100%, p.s.i | 750 | 1,100 | 480 |
| Modulus 300%, p.s.i | 1,800 | 4,250 | |
| Permanent set, percent | 2 | 2 | 54 |
| Tear strength, D–470, p.l.i | 50 | 70 | 140 |
| Compression set B, 70° C./22 hr., percent | 20 | 22 | 87 |
| Hardness: | | | |
| Durometer A | 85 | 92 | |
| Durometer D | | | 77 |
| NBS abrasion resistance, percent | 81 | | 311 |

EXAMPLE 6

The procedure of Example 3 is repeated but the amounts of o-chloroaniline, aniline and formaldehyde are changed to 382.5 pts., 93 pts. and 186.5 pts., respectively. These amounts correspond to a mole ratio of aniline to o-chloroaniline of 1/3 and a mole ratio of total amine to formaldehyde of 1.75/1.

The recovery of unreacted monoamines from this condensation is nil. The liquid product has a Brookfield viscosity of 2168 cps. at 50° C., an average molecular weight of 304, a nitrogen assay of 11.0% and a calculated functionality of 2.37. In contrast to the curing agent prepared in Example 5, this material does not show any sign of crystallization at room temperature within 10 weeks.

The table below illustrates compouding data, curing conditions and vulcanizate properties for a vulcanizate (Sample 1) prepared from Prepolymer B and the liquid product of this example.

|  | Sample No. 1 |
|---|---|
| Prepolymer B, pts. | 100 |
| Polyamine, pts. | 19.6 |
| Curative level, percent | 100 |
| Mixing temperature, ° C. | 60 |
| Pot life, min. | 10 |
| Cure time at 100° C., hrs. | 3.0 |
| Tensile strength, p.s.i. | 6125 |
| Elongation at break, percent | 260 |
| Modulus 100%, p.s.i. | 1100 |
| Tear strength, D–470, p.l.i. | 63 |
| Compression set B, 70° C./22 hr., percent | 24 |
| NBS abrasion resistance, percent | 237 |
| Hardness, durometer A | 87 |

When a vulcanizate is prepared from Prepolymer A using 4,4'-methylenebis(2-chloroaniline) at a curative level of 95% of theory as curing agent, it has about the same hardness as Sample 1 and manifests inferior compression set and NBS abrasion resistance when tested by the same procedures as indicated above.

EXAMPLE 7

The procedure of Example 5 is repeated except that 279 pts. of aniline and 127.5 pts. of o-chloroaniline are employed and the heating cycle at 85–90° C. is increased to 2 hrs. These amounts correspond to a mole ratio of aniline to o-chloroaniline of 3/1 and an amine/formaldehyde ratio of 2/1.

36 parts of substantially pure aniline is recovered. The liquid polyamine obtained has a Brookfield viscosity of 990 cps. at 50° C. and a nitrogen assay of 12.8%. It does not show any tendency to crystallize after standing at room temperature for 1 year.

EXAMPLE 8

Aqueous formaldehyde solution (37%, 162 pts.) is added at 30° C. with agitation to a reaction mixture consisting of aniline (93 pts.), 97% sulfuric acid (445 pts.) and water (650 pts.). After stirring at 30–35° C. for 10 minutes, o-chloroaniline (382.5 pts.) is added at once causing the temperature to rise to 60° C. These amounts correspond to a mole ratio of aniline to o-chloroaniline of 1/3 and a mole ratio of total amines to formaldehyde of 2/1. The reaction mixture is heated at 85–90° C. for 2 hours and then worked up by the procedure described in Example 1. The recovered monoamines (48 pts.) consist largely of o-chloroaniline (ca. 95%). After standing at room temperature for 2 days, the product shows signs of crystallization.

The vulcanizate properties obtained with Prepolymers A, B and C are substantially the same as those observed with the polyamine of Example 5.

EXAMPLE 9

The procedure of Example 2 is repeated, but the amounts of o-chloroaniline, aniline, sulfuric acid, water and 37% aqueous formaldehyde are changed to 382.5 pts., 35 pts., 380 pts., 510 pts. and 164.2 pts., respectively. These amounts correspond to a mole ratio of aniline to o-chloroaniline of 1/8 and a mole ratio of total amine to formaldehyde of 1.69/1.0.

No unreacted monoamines are recovered from this condensation. The liquid product has a Brookfield viscosity of 3060 cps. at 50° C., an average molecular weight of 336, a nitrogen assay of 10.7% and a calculated functionality of 2.57. The polyamine remains liquid for 3 weeks at room temperature.

EXAMPLE 10

To a mixture of 127 g. of o-chloroaniline, 100 g. of 36.5% hydrochloric acid and 300 ml. of water, 80 g. of 37% aqueous formaldehyde is added at 25–30° C. After stirring for 15 minutes, 93 g. of aniline and 97 g. of 36.5% hydrochloric acid is added which raises the temperature to 45° C. Within 30 minutes, the reaction mass is heated to 80° C. The temperature is maintained at 80° C. for 5 hours. The charge is neutralized by adding 83 g. of sodium hydroxide and the organic layer is separated and washed twice with hot water. Water and about 10 g. of unreacted monoamines are removed by vacuum distillation. The residue is a viscous liquid at room temperature which after standing for a month shows no sign of crystallizing. The product has the following analysis: C, 66.4%; H, 6.0%; N, 11.2% and Cl, 16.8%.

When a portion (180 g.) of the above polyamine is distilled at reduced pressure (0.15 mm. Hg), the first fraction (collected at a head temperature of 167° C. and a pot temperature up to 210° C.), amounting to 85 g., is a diamine fraction enriched in 3-chloro-4,4'-diaminodiphenylmethane (Calc. for $C_{13}H_{13}ClN_2$ (232.7) (percent); C, 67.1; H, 5.63; Cl, 15.24; N, 12.05. Found (percent): C, 67.05; H, 5.65; Cl, 15.55; N, 12.05. The material has a melting point of 77–79° C. Substantially pure 3-chloro-4,4'-diaminodiphenylmethane melting point 81–83° C. can be obtained from the enriched fraction by routine fractional extractions with dilute aqueous acetic acid. A vulcanizate prepared by mixing 100 parts of Prepolymer A with 10.8 parts of the fraction enriched in 3-chloro-4,4'-diaminodiphenylmethane at 80° C. and curing for 3 hours at 100° C. has a tensile strength of 5600 p.s.i., an elongation at break of 600%, a tear strength of 114 p.l.i. and a hardness, Durometer A of 92.

EXAMPLE 11

This example describes the use of the polyamine prepared in Example 2 as a curing agent for the full-strength application of a castable urethane elastomer by spraying. The prepolymer used is a mixture of 4 parts of Prepolymer B and 6 parts of Prepolymer C. The polyamine curing agent and isocyanato-terminated prepolymer are fed from separate heated vessels by metering pumps through heated lines to an airless internal mixing spray gun (Model 43, Binks Manufacturing Co.). The polyamine is fed to the spray gun at a temperature of about 121° C.; the prepolymer at about 85–88° C. About 22 parts of polyamine is supplied for each 100 parts of prepolymer. By employing spray nozzles having orifices ranging from 0.043 to 0.072" in diameter, about 7–11 lb./min. of elastomer may be applied with this equipment. The elastomer is sprayed on wall board and on concrete at a temperature of about 50–55° F. Within 10 minutes the sprayed material is tack-free. Under similar conditions, using 4,4'-methylenebis(2-chloroaniline) as the curing agent, the tack-free time is about 30 minutes. The elastomer adheres tenaciously to these surfaces. The appearance of the coating is comparable to that of coatings produced with conventional curing agents such as 4,4'-methylenebis(2-chloroaniline). The operability of the spray equipment is excellent with the polyamine curing agent of this invention. When used with 4,4'-methylenebis(2-chloroaniline), the same equipment frequently fails to function because the curing agent freezes, and plugs the spray gun or the curing agent feed line.

EXAMPLE 12

A semi-rigid foam is prepared by a one-shot procedure in which two streams are brought together continuously in a high-speed mixing head. The ingredients employed and their proportions in parts by weight for the two streams are listed below.

Stream 1 (38–43° C.): Parts

Polypropylene ether triol, number average molecular weight 4500, hydroxyl No. 38, prepared by reacting propylene oxide with glycerine and capping with ethylene oxide to give primary hydroxyl groups. The triol used is commercially available as "Voranol" C-4601 _____ 100
Polydimethylsiloxane, 50 centistoke grade _____ 1
Triethylene diamine, 33% in dipropylene glycol __ 1.5
Dibutyl tin dilaurate _____ 0.02
Amine mixture prepared in Example 6 _____ 20

Stream 2 (24° C.):

Tolylene diisocyanate isomer mixture (65% 2,4-; 35% 2,6-) _____ 20.5
Fluorotrichloromethane _____ 12

Equipment suitable for metering and mixing the streams is described in Du Pont Elastomers Chemicals Bulletin HR–32, "Metering and Mixing Equipment for the Production of Urethane Foam Products" by S. A. Steward, E. I. du Pont de Nemours and Company (Inc.), Wilmington, Del., September 1958.

The mixture discharged from the high-speed mixer is directed into aluminum molds for forming 9" x 2" x 2.5" automotive arm rests. The molds are treated with a mold release agent and heated to 60–74° C. prior to filling. About 3 minutes after the molds have been filled, the molded arm rests have developed sufficient strength to permit their removal from the molds. After standing over night at room temperature the moldings are fully cured. The over-all density of the finished moldings is 13 lb./cu. ft.; the density of the cores 8.4 lb./cu. ft. The foam has a tensile strength at break of 68 p.s.i. and an elongation at break of 170%. The surface of the molded arm rests is smooth and accurately reproduces the pattern of the molds.

EXAMPLE 13

This example describes the preparation of a semi-rigid foam by a semi-prepolymer procedure. A prepolymer is prepared by heating a mixture of 100 parts of the polypropylene ether triol described in Example 12 and 81 parts of a mixture of tolylene diisocyanate isomers (80% 2,4-; 20% 2,6-) at 80° C. for 1 hour. The prepolymer is then cooled to room temperature. It has an NCO content of about 20%.

Two streams having the compositions shown below are mixed as in Example 12.

Stream 1 (24° C.): Parts
Prepolymer, 20% NCO _____ 100
Fluorotrichloromethane _____ 30
Stream 2 (52° C.):
Polypropylene ether triol, described in Example 12 _____ 179
Amine mixture prepared in Example 6 _____ 45.7
Stannous octoate _____ 0.2
Triethylene diamine, 33% in dipropylene glycol _____ 2.5
Polydimethylsiloxane, 50 centistoke grade ___ 1.0

The mixture produced by continuously feeding the two streams to a high-speed mixer is discharged into lubricated aluminum molds previously heated to 60° C. The molded articles are stripped from the molds 2 minutes after filling. After standing overnight the foam articles are fully cured. The properties of the molded foam are equivalent to those of the foam prepared in Example 12.

The short demolding times indicated in Examples 12 and 13 reflect the rapid development of gel strength characteristic of foam compositions prepared by using the curing agents of this invention.

EXAMPLE 14

To a mixture of o-chloroaniline (510 parts), 97% sulfuric acid (450 parts) and water (850 parts), 37% aqueous formaldehyde (191 parts) is added with agitation at 35–40° C. These amounts correspond to a mole ratio of o-chloroaniline to formeldehyde of 1.7/1.0. The temperature is raised to 85° C. within 30 minutes and maintained at 85–95° C. for 4 hours. The reaction mixture is then poured into a solution of 360 parts of sodium hydroxide in 500 parts of water. The organic layer is separated from the aqueous layer and washed with an equal volume of hot water. The organic layer is freed of water by distillation at 150° C./0.5 mm. Hg and then filtered. No o-chloroaniline is recovered during the distillation.

This product has an average molecular weight of 316. The assay for nitrogen is 10.15% and the calculated functionality is 2.32. When the molten product is cooled to 60° C. and agitated at 60° C., the first crystals appear after 85 minutes. This is in contrast to 4,4'-methylenebis (2-chloroaniline) which deposits crystals before the temperature of the molten material reaches 60° C.

A vulcanizate prepared by mixing 6.34 parts of the curing agent of this example with 50 parts of Prepolymer A at 60° C. followed by curing for 3 hours at 100° C. has the following properties.

Tensile strength, p.s.i. _____ 5700
Modulus, 300%, p.s.i. _____ 2200
Permanent set, percent _____ 3
Tear strength, D–470, p.l.i. _____ 35
Hardness, durometer A _____ 87
Compression set B, 70° C./22 hr., percent _____ 25
Bashore resilience, percent _____ 40

EXAMPLE 15

The procedure of Example 14 is repeated except the amount of 37% aqueous formaldehyde is increased to 205 parts. This gives a 2-chloroaniline to formaldehyde ratio of 1.5. The product has a Brookfield viscosity of 4350 cps. at 50° C. and an average molecular weight of 333. The assay for nitrogen is 10.4% and the calculated functionality is 2.45. When the molten product is cooled to 60° C. and agitated at 60° C., several hours elapse before the first crystals appear. The curing agent of this example is particularly useful in the preparation of urethane foam by procedure such as those described in Examples 12 and 13.

EXAMPLE 16

To a mixture of o-chloroaniline (190.5 parts), o-toluidine (53.5 parts), 37% hydrochloric acid (197 parts) and water (400 parts), 37% aqueous formaldehyde (80 parts) is added with agitation at 10° C. These amounts correspond to a mole ratio of o-toluidine to 2-chloroaniline of 1/3 and a mole ratio of total monoamine to formaldehyde of 2/1. Following formaldehyde addition, the temperature is raised to 80° C. within 30 minutes and maintained at 80° C. for 5 hours. About 85 parts of sodium hydroxide pellets are added to the reaction mass and the organic layer is separated from the aqueous layer. The organic layer is washed with hot water and dried by distillation at 120° C./2 mm. Hg.

The product has a melting range of 72–85° C.; it exhibits a lesser tendency to crystallize than do such hindered prior art curing agent as 4,4'-methylenebis(2-chloroaniline). When 9.2 parts of this material are mixed at 100° C. with 75 parts of Prepolymer A and cured for 3 hours at 100° C., a vulcanizate is obtained which has a tensile strength of 2800 p.s.i., a 300% modulus of 1550 p.s.i., D-470 tear strength of 65 p.l.i. and a hardness, Durometer A of 84

EXAMPLE 17

To a mixture of 2-chloroaniline (127 parts) 37% hydrochloric acid (100 parts) and water (300 parts), 37% aqueous formaldehyde (80 parts) is added with agitation at 25–30° C. The reaction mass is agitated for 15 minutes at 25–30° C. and then o-toluidine (107 parts) and additional 37% hydrochloric acid are added. These amounts correspond to a mole ratio of total amine to formaldehyde of 2/1. The reaction mass is heated to 80° C. within 30 minutes and maintained at 80° C. for 5 hours. The charge is neutralized by adding 83 parts of sodium hydroxide. The organic layer is separated and washed twice with hot water.

About 201 parts of the resulting product are distilled at 0.4 mm. Hg. The first fraction amounts to 155 parts of diamines having a boiling point of 189° C. This fraction has a melting point of 84–100° C. and contains about 50% 3-methyl-3'-chloro-4,4'-methylenedianiline, 30% 4,4'-methylenebis(2-chloroaniline) and 20% 4,4'-methylenebis(2-methylaniline) as determined by gas chromatography.

EXAMPLE 18

To a mixture of 2-chloroaniline (382.5 parts), o-toluidine (107 parts), 97% sulfuric acid (445 parts) and water (650 parts), 36.6% aqueous formaldehyde (198 parts) is added with agitation at 40–50° C. These amounts correspond to a mole ratio of o-toluidine to 2-chloroaniline of 1/3 and a mole ratio of total monoamine to formaldehyde of 1.65/1. The temperature is then raised to 85° C. within 1 hour and the reaction mass is maintained at 85–90° C. for two hours. The reaction mass is neutralized by the addition of a solution of 360 parts of sodium hydroxide in 400 parts of water. The organic layer is separated and washed twice with 1000 parts of water at 90° C. The organic layer is dried by heating to 120° C. at a pressure of 1 mm. Hg and filtered. No monoamine is recovered.

The product has a Brookfield viscosity of 5700 cps. at 50° C. and an average molecular weight of 325. The assay for amino group nitrogen is 10.6% and the calculated functionality is 2.46.

The product does not show any signs of crystallizing after standing at room temperature for 12 weeks. It is especially useful in the preparation of urethane foam by the procedures described in Examples 12 and 13.

EXAMPLE 19

To a mixture of o-chloroaniline (510 parts), 97% sulfuric acid (445 parts) and water (650 parts), 36.6% aqueous formaldehyde (242 parts) is added with agitation at 40–50° C. These amounts correspond to a mole ratio of o-chloroaniline to formaldehyde of 1.35/1.0. Within an hour, the temperature is raised to 85° C. and maintained at 85–90° C. for 2 more hours. The reaction mixture is then poured into a solution of 360 parts of sodium hydroxide in 500 parts of water. The organic layer is separated, washed with an equal volume of hot water and dried by distillation at 120° C. and 1 mm. Hg. No unreacted monoamine is obtained during the distillation. Following distillation the product is filtered.

The product has an average molecular weight of 367. The assay for nitrogen is 10.2% and the calculated functionality is 2.67. The product has a Brookfield viscosity of 1270 cps. at 75° C. The product does not show any sign of crystallization after standing at room temperature for several months.

A semi-rigid foam is prepared from this product by a batch one-shot procedure employing the following formulation:

Mixture 1: Parts
   Polypropylene ether triol of Example 12 ____ 100
   Polydimethylsiloxane, 50 centistoke grade ___ 1
   Triethylene diamine, 33% in dipropylene glycol _____ 1.5
   Dibutyl tin dilaurate _____ 0.1
   Amine mixture of this example _____ 21.6
Mixture 2:
   Tolylene diisocyanate isomer mixture (80% 2,4-; 20% 2,6-) _____ 20.4
   Fluorotrichloromethane _____ 10

Mixture 1 is heated to 43–44° C. and Mixture 2 (at room temperature) is then added to Mixture 1 and the entire mass is vigorously agitated for about 6 seconds and then poured in a mold and allowed to foam. The density and stress-strain properties of the resulting foam are similar to those of the foams prepared in Examples 12 and 13. The rates of foam rise and curing to a tack-free state are somewhat slower than those observed with the amine mixture used in Examples 12 and 13. The finished foam is covered with a smooth, adherent skin similar to that observed for the foams prepared in Examples 12 and 13.

EXAMPLE 20

A medium density flexible foam is prepared by a batch procedure using the following formulation:

Solution 1:
   Polyalkyleneether triol, hydroxyl number 37.1, prepared by condensing 1,2-propylene oxide with 1,1,1-trimethylolpropane and capping with ethylene oxide—75.0 g.
   Amine mixture of Example 6—15.0 g.
   Polydimethylsiloxane oil, 50 centistoke grade—0.75 ml.
   Triethylene diamine, 33% solution in dipropylene glycol—1.13 ml.
   Stannous octoate—0.10 g.
Solution 2:
   Tolylene diisocyanate, 65% 2,4-isomer and 35% 2,6-isomer—15.1 g.
   Trichlorofluoromethane—12.0 g.

Solution 1 is prepared by dissolving the amine mixture in the triol and then adding the other ingredients. Solution 1 at about 25° C. is stirred in a 250 ml. beaker with a small high-speed mixer for 30 seconds and then solution 2, also at about 25° C., is added rapidly and mixing continued for 3 seconds. The mixture is then poured immediately into a 1 quart container and allowed to foam. The foam rises to its full height in 41 seconds and after 70 seconds its surface is no longer tacky. The foam is resilient and has an overall density of 7.8 lbs./cu. ft.

When the above procedure is repeated wtih the exception that the amine mixture of Example 6 (15.0 g.) is replaced with an equivalent amount of 4,4'-methylenedianiline (11.6 g.), solidification of the mixture of Solution 1 and Solution 2 occurs in the beaker in less than 3 seconds without foaming. This result demonstrates that the prior art unhindered diamine 4,4'-methylenedianiline is so reactive that it cannot be used successfully to prepare foams of the type described hereinbefore.

When the above procedure is again repeated with the exception that the amine mixture of Example 6 (15.0 g.) is replaced with an equivalent amount of 4,4'-methylenebis(2-chloroaniline) (15.7 g.), the mixture of Solutions 1 and 2 does not start to foam until it has been poured into the container. The foam hardens suddenly before expansion can be completed and large bubbles of gas escape and some splitting occurs. The foam stops expanding in only 21 seconds measured from the start of mixing of Solutions 1 and 2. The resulting foam is hard and dense and has an overall density of 21 lbs./cu. ft. This run demonstrates the lower reactivity of a prior art hindered diamine and the tendency toward premature gelling before full expansion can take place, the latter effect resulting in inefficient utilization of the expanding agent, splitting and a dense, stiff product.

When the amine mixture of Example 6 is replaced with an equimolar mixture of 4,4'-methylenedianiline (5.8 g.) and 4,4'-methylenebis(2-chloroaniline) (7.8 g.) the mixture of Solutions 1 and 2 solidifies in the beaker before it can be poured and only little foam formation occurs.

When the amine mixture of Example 6 is replaced with 3-chloro-4,4'-diaminodiphenylmethane (13.6 g.) foaming starts before the mixture of Solutions 1 and 2 can be poured into the container. However, the foam rises smoothly to maximum height in 28 seconds and after 50 seconds its surface is no longer tacky. The foam is resilient and has an overall density of 8 lbs./cu. ft.

The curing agent of Example 6 is much more conveniently handled and generally gives foams of better compression set than any of the diamine curing agents used in this example.

What is claimed is:

1. An amine curing agent prepared by condensing a monoamine composition with formaldehyde in the presence of a mineral acid; said monoamine composition consisting essentially of about 20–100 mole percent 2-chloroaniline, 0–80 mole percent aniline and 0–80 mole percent o-toluidine, wherein the mole ratio of the moles of monoamine to the moles of formaldehyde is more than 1.6 but does not exceed 2.0, with the proviso that when the monoamine consists essentially of 2-chloroaniline said mole ratio does not exceed 1.8.

2. A curing agent of claim 1 wherein the monoamine composition consists essentially of 0–50 mole percent aniline, 0–50 mole percent o-toluidine and 50–90 mole percent 2-chloroaniline.

3. A curing agent of claim 1 wherein the ratio of the total moles of monoamine to the moles of formaldehyde is from about 1.65–1.9.

4. A curing agent of claim 1 wherein at least a portion of the monoamine composition used is crude 2-chloro aniline.

5. A curing agent of claim 1 wherein the monoamine composition is a mixture of aniline and 2-chloroaniline in which the mole ratio of aniline to 2-chloroaniline is about 0.1–4.0 and the ratio of the total moles of aniline and 2-chloroaniline to the moles of formaldehyde is more than 1.6 but does not exceed 2.0.

6. A curing agent of claim 5 wherein the mole ratio of aniline to 2-chloroaniline used is from about 0.1–1.0.

7. A curing agent of claim 5 wherein the ratio of the total moles of aniline and 2-chloroaniline to the moles of formaldehyde is from about 1.65–1.9.

8. A curing agent of claim 5 wherein the mole ratio of aniline to 2-chloroaniline used is from about 0.1–1.0 and the ratio of the total moles of aniline and 2-chloroaniline to the moles of formaldehyde is from about 1.65–1.9.

9. A curing agent of claim 5 wherein at least a portion of the monoamine composition is crude 2-chloroaniline.

10. A curing agent of claim 1 wherein the monoamine composition consists essentially of 2-chloroaniline.

References Cited

UNITED STATES PATENTS

| | | | |
|---|---|---|---|
| 3,073,865 | 1/1963 | Spiegler | 260—508X |
| 3,097,191 | 7/1963 | France et al. | 260—77.5 |
| 3,412,071 | 11/1968 | Sundholm | 260—75 |

RICHARD D. LOVERING, Primary Examiner

U.S. Cl. X.R.

260—2.5, 75, 77.5, 570